US012124985B1

(12) United States Patent
Smith et al.

(10) Patent No.: US 12,124,985 B1
(45) Date of Patent: Oct. 22, 2024

(54) APPARATUS AND A METHOD FOR THE GENERATION OF PRODUCTIVITY DATA

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/406,889

(22) Filed: Jan. 8, 2024

(51) Int. Cl.
| | |
|---|---|
| G06Q 10/06 | (2023.01) |
| G02B 27/00 | (2006.01) |
| G06Q 10/0639 | (2023.01) |
| G10L 15/22 | (2006.01) |
| H04L 67/306 | (2022.01) |

(52) U.S. Cl.
CPC ..... *G06Q 10/0639* (2013.01); *G02B 27/0093* (2013.01); *G10L 15/22* (2013.01); *H04L 67/306* (2013.01)

(58) Field of Classification Search
CPC ..................................................... G06Q 10/06
USPC ............................................................ 705/7.38
See application file for complete search history.

(56) References Cited

U.S. PATENT DOCUMENTS

| | | |
|---|---|---|
| 2006/0017978 A1 | 1/2006 | Minamino et al. |
| 2011/0158524 A1 | 6/2011 | Ohba et al. |
| 2017/0372225 A1 | 12/2017 | Foresti |
| 2018/0005160 A1 | 1/2018 | Johnson |
| 2018/0107793 A1* | 4/2018 | Ni .......................... G16H 20/00 |
| 2019/0108275 A1 | 4/2019 | Gulli et al. |

(Continued)

FOREIGN PATENT DOCUMENTS

| | | |
|---|---|---|
| AU | 2021105421 A4 | 10/2021 |
| CN | 113570481 A | 10/2021 |
| KR | 10-2015-0053317 A | 5/2015 |

OTHER PUBLICATIONS

Alti, An Advanced IoT-Based Tool for Effective Employee Performance Evaluation in the Banking Sector, (journal), Feb. 28, 2021, Ingénierie des Systèmes d'Information, vol. 26, No. 1, 2021, p. 103-108, IIETA.

(Continued)

*Primary Examiner* — Nga B Nguyen
(74) *Attorney, Agent, or Firm* — Caldwell Intellectual Property Law

(57) ABSTRACT

An apparatus for the generation of productivity data is disclosed. The apparatus includes at least a processor and a memory communicatively connected to the at least a processor. The memory instructs the processor to receive a user profile from a user, wherein the user profile comprises industrial data. The memory instructs the processor to identify an attention parameter as a function of the industrial data and a plurality of industrial stimuli, wherein identifying the attention parameter comprises receiving physiological data from a plurality of sensors. The memory instructs the processor to generate an engagement element as a function of the attention parameter. The memory instructs the processor to determine productivity data as a function of the engagement element. The memory instructs the processor to generate a notification as a function of the productivity data. The memory instructs the processor to display the notification using a display device.

18 Claims, 10 Drawing Sheets

(56) References Cited

U.S. PATENT DOCUMENTS

| | | | | |
|---|---|---|---|---|
| 2019/0122531 | A1* | 4/2019 | Harris | H04N 23/90 |
| 2019/0224841 | A1* | 7/2019 | Ly | A61B 5/4504 |
| 2019/0343429 | A1* | 11/2019 | Elhawary | A61B 5/6823 |
| 2021/0158207 | A1* | 5/2021 | Alsahlawi | G06N 5/04 |
| 2021/0169417 | A1* | 6/2021 | Burton | A61B 5/4857 |
| 2021/0383261 | A1 | 12/2021 | Hanna et al. | |
| 2022/0004964 | A1 | 1/2022 | Essafi et al. | |
| 2022/0172594 | A1* | 6/2022 | Cho | G08B 7/06 |
| 2022/0245557 | A1 | 8/2022 | Minter et al. | |
| 2022/0261735 | A1 | 8/2022 | Kotzen | |
| 2022/0313118 | A1* | 10/2022 | Elhawary | G06F 18/00 |
| 2022/0330839 | A1* | 10/2022 | Levinson | G16H 20/30 |
| 2022/0330853 | A1* | 10/2022 | Orvis | G16H 20/60 |
| 2022/0374812 | A1 | 11/2022 | Riedl | |
| 2022/0405692 | A1 | 12/2022 | Trikannad | |
| 2023/0031942 | A1* | 2/2023 | Shrestha | G06Q 10/063114 |
| 2023/0036730 | A1 | 2/2023 | Casa | |
| 2023/0112656 | A1* | 4/2023 | Frederick | G06Q 10/105 |
| | | | | 700/112 |
| 2023/0360161 | A1* | 11/2023 | Dixit J | G06Q 50/265 |
| 2024/0054431 | A1* | 2/2024 | Jayathirtha | G06Q 10/06398 |

OTHER PUBLICATIONS

Khanbabaei, "Applying clustering and classification data mining techniques for competitive and knowledge-intensive processes improvement," 2019, Knowledge and Process Management, vol. 26, pp. 123-129 (Year: 2019).

* cited by examiner

APPARATUS AND A METHOD FOR THE GENERATION OF PRODUCTIVITY DATA

FIELD OF THE INVENTION

The present invention generally relates to the field of artificial intelligence. In particular, the present invention is directed to an apparatus and a method for the generation of productivity data.

BACKGROUND

Automating productivity management has proven to be increasingly important and difficult in today's fast-paced business environment. Attempts to automate the measurement and analysis of employees have proven to be difficult due to the number of variables and inaccuracies that are involved. Current attempts at generating productivity data often rely on manual data entry or limited automation, which can lead to errors and inconsistencies in the data.

SUMMARY OF THE DISCLOSURE

In an aspect, an apparatus for the generation of productivity data is disclosed. The apparatus includes at least a processor and a memory communicatively connected to the at least a processor. The memory instructs the processor to receive a user profile from a user, wherein the user profile comprises industrial data. The memory instructs the processor to identify an attention parameter as a function of the industrial data and a plurality of industrial stimuli, wherein identifying the attention parameter comprises receiving physiological data from a plurality of sensors. The memory instructs the processor to generate an engagement element as a function of the attention parameter. The memory instructs the processor to determine productivity data as a function of the engagement element. The memory instructs the processor to generate a notification as a function of the productivity data. The memory instructs the processor to display the notification using a display device.

In another aspect, a method for the generation of productivity data. The method comprises receiving, using at least a processor, a user profile from a user, wherein the user profile comprises industrial data. The method comprises identifying, using the at least a processor, an attention parameter as a function of the industrial data and a plurality of industrial stimuli, wherein identifying the attention parameter comprises receiving physiological data from a plurality of sensors. The method comprises generating, using the at least a processor, an engagement element as a function of the attention parameter. The method comprises determining, using the at least a processor, productivity data as a function of the engagement element. The method comprises generating, using the at least a processor, a notification as a function of the productivity data. The method comprises displaying, using the at least a processor, the notification using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of productivity data is disclosed. The apparatus includes at least a processor and a memory communicatively connected to the at least a processor. The memory instructs the processor to receive a user profile from a user, wherein the user profile comprises industrial data. The memory instructs the processor to identify an attention parameter as a function of the industrial data and a plurality of industrial stimuli, wherein identifying the attention parameter comprises identifying the attention parameter using a plurality of sensors. The memory instructs the processor to generate an engagement element as a function of the attention parameter. The memory instructs the processor to determine productivity data as a function of the engagement element. The memory instructs the processor to generate a notification as a function of the productivity data. The memory instructs the processor to display the notification using a display device. Exemplary embodiments illustrating aspects of the present disclosure are described below in the context of several specific examples.

Figure 1:
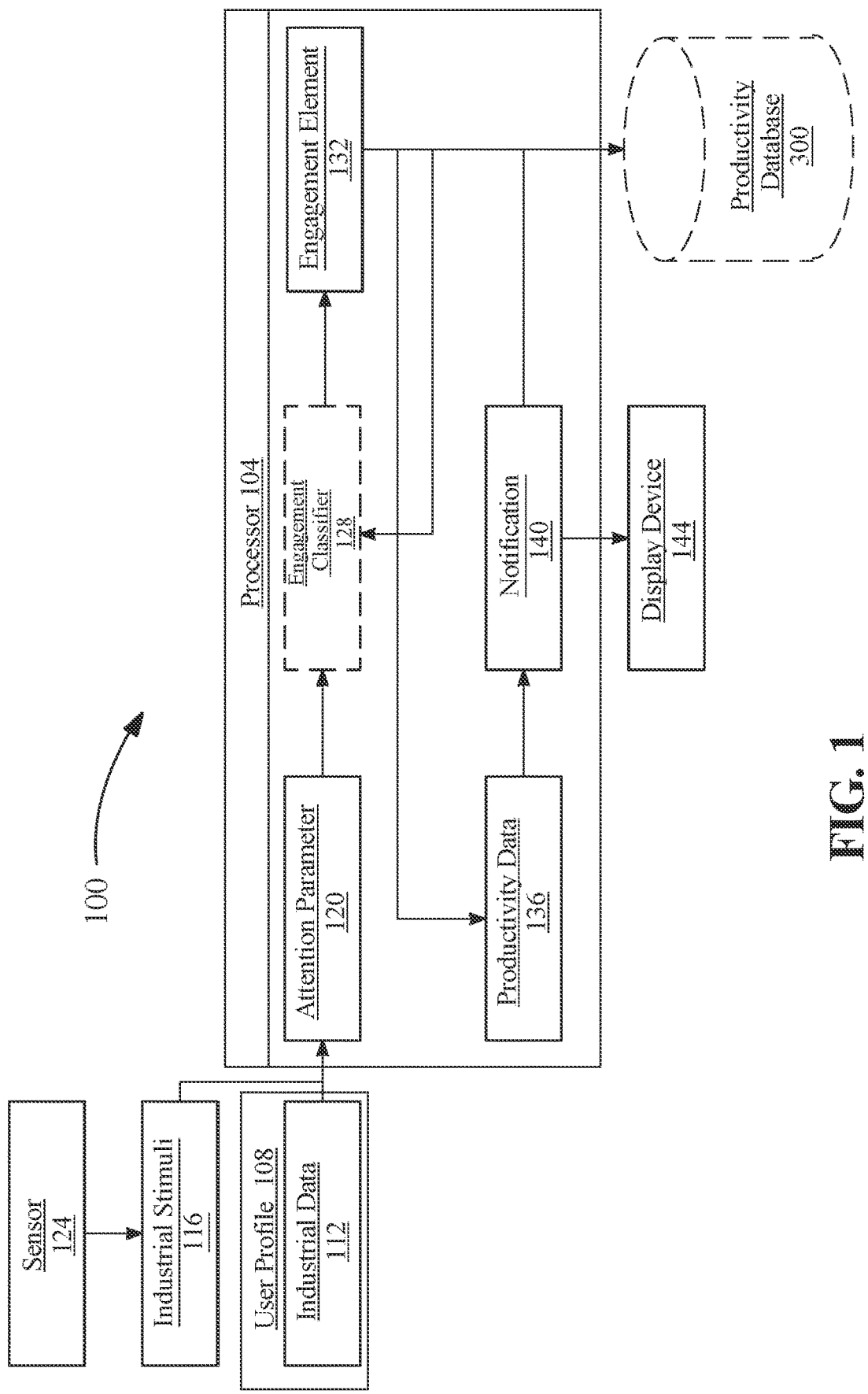
FIG. 1 is a block diagram of an exemplary embodiment of an apparatus for the generation of productivity data.

Referring now to FIG. 1, an exemplary embodiment of apparatus 100 for the generation of productivity data is illustrated. Apparatus 100 includes a processor 104. Processor 104 may include any computing device as described in this disclosure, including without limitation a microcontroller, microprocessor, digital signal processor (DSP), and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks as disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to extract a user profile 108 from a user. For the purposes of this disclosure, a "user profile" is a representation of information and/or data describing information associated with a user. A user profile 108 may be made up of a plurality of user data. As used in the current disclosure, "user data" is information associated with the user. A user profile 108 may be created by a processor 104, a user, or a third party. The user profile 108 may include any of the following personal information: age, weight, height, gender, credit, geographical location, financial information, medical history, marital status, relationship history, familial history, user goals, business goals, productivity goals, and the like. A user profile 108 may include information about the user's occupation. A user profile 108 may include a plurality of voice parameters from the users and their co-workers. As used in the current disclosure, a "voice parameter" is a voice sample from a person. The voice parameter may be a voice sample that is suitable for voice recognition software. This may include topics related to the user's profession, industry, job function, professional status, public speaking ability, personal/professional networking capabilities, and the like. A user profile 108 may additionally include information regarding the user's occupation. This may include the user's job title, salary, net worth, debts, revenue, gross income, net income, business debts, a list of business expenses, accounting information, and the like. In a non-limiting example, the user profile may be consistent with or substantially consistent with the user profile 108 described in U.S. patent application Ser. No. 18/141,320, filed on Apr. 28, 2023, titled "METHOD AND AN APPARATUS FOR ROUTINE IMPROVEMENT FOR AN ENTITY," which is incorporated by reference herein in its entirety.

With continued reference to FIG. 1, a user profile 108 may include industrial data 112 associated with the user. As used in the current disclosure, "industrial data" is data related to the occupation of the user. Industrial data 112 may include a listing of any task or set of tasks that the user is responsible for. Industrial data 112 may include a description of all of the tasks and sub-tasks that a user accomplishes in a given time period. This may include personal and professional tasks. Industrial data 112 may describe the responsibilities of a user, employee, manager, or owner. Industrial data 112 may represent internal or external tasks as it relates to the entity. Examples of industrial data 112 may include but are not limited to data describing managerial responsibilities, providing a service, making goods, maintaining a facility, interfacing with clients, accounting activities, product selection, ordering inventory, hiring/firing of employees, employee management, resource management, assigning tasks, and the like. Industrial data 112 may be entered into processor 104 by a user. Processor 104 may additionally be configured to generate industrial data 112 based on the purpose of the corporation, job descriptions of the employee, the number of goods promised, the number of services to be provided, and the like. This may be done using a machine learning model or fuzzy inference set. In an embodiment, industrial data 112 may be generated using a webcrawler.

With continued reference to FIG. 1, processor 104 may receive industrial data 112 from a third-party source using an application programming interface (API). As used in the current disclosure, an "application programming interface" is a way for two or more computer programs to communicate with each other. An application programming interface may be a type of software interface, offering a service to other pieces of software. In contrast to a user interface, which connects a computer to a person, an application programming interface may connect computers or pieces of software to each other. An API may not be intended to be used directly by a person (the end user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet.

With continued reference to FIG. 1, processor 104 may be configured to generate an estimated completion time as a function of industrial data 112. An "estimated completion time," as used herein, is an estimation of how long a task or a set of tasks associated with industrial data 112 will take to be completed. In some embodiments, estimated completion time may be stored in a database, such as database 300. In some embodiments, processor 104 may estimate the completion time for a project by querying a database, where the database includes completion times for other entities and/or personnel. In an embodiment, processor 104 may estimate the completion time for a project based on a plurality of queried completion times. In a non-limiting example, processor 104 may query a database for the completion time for a task or a set of tasks, where the task may have different completion times for each person in the database. In this non-limiting example, processor 104 may be configured to generate an estimated completion time by averaging the different completion times received. It will be apparent to one of ordinary skill, upon reading this disclosure, of the many methodologies that can be used to ascertain an estimated completion time for a function.

With continued reference to FIG. 1, processor 104 may generate an estimated completion time using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of estimated completion times compared to industrial data 112. Data within the lookup table may be received from database 300. Lookup tables may also be used to generate estimated completion times by matching an input value to an output value by matching the input against a list of valid (or invalid) items in an array. In a non-limiting example, industrial data 112 may indicate that an entity has to accomplish a set of tasks or project. Examples of estimated completion times indicate that the completion time for a set of tasks or projects described by industrial data 112 has historically been between 45 minutes and 1 hour. A lookup table may look up industrial data 112 as an input and output estimated completion times indicating that the employee should complete the task in less than 1 hour. Processor 104 may be configured to "lookup" or input any data described within the entirety of the current disclosure. Data from the lookup table may be compared to examples of estimated completion times, for instance, and without limitation using string comparisons, numerical comparisons such as subtraction operations, or the like. Alternatively or additionally, a query representing elements of industrial data 112 may be submitted to the lookup table and/or a database.

With continued reference to FIG. 1, a user profile 108 may be received by processor 104 through user input. For example, and without limitation, the user or a third party may manually input user profile 108 using a graphical user interface of processor 104 or a remote device, such as for example, a smartphone or laptop. The user profile 108 may additionally be generated via the answer to a series of questions. The series of questions may be implemented using a chatbot, as described herein below. A chatbot may be configured to generate questions regarding any element of the user profile 108. In a non-limiting embodiment, a user may be prompted to input specific information or may fill out a questionnaire. In an embodiment, a graphical user interface may display a series of questions to prompt a user for information pertaining to the user profile 108. The user profile 108 may be transmitted to processor 104, such as via a wired or wireless communication, as previously discussed in this disclosure. The user profile 108 can be retrieved from multiple sources third-party sources including the user's inventory records, financial records, human resource records, past user profiles 108, sales records, user notes and observations, and the like. A user profile may be placed through an encryption process for security purposes.

With continued reference to FIG. 1, a user profile 108 may be generated using a smart assessment. As used in this disclosure, a "smart assessment" is a set of questions that asks for user's information as described in this disclosure. In some cases, questions within smart assessment may include selecting a selection from a plurality of selections as answers. In other cases, questions within smart assessment may include free user input as answers. In a non-limiting example, a smart assessment may include a question asking the user regarding project data; for instance, the question may be "What is the end goal of this project?" In some cases, a smart assessment may be in a form such as, without limitation, survey, transactional tracking, interview, report, events monitoring, and the like thereof. In some embodiments, a smart assessment may include a data submission of one or more documents from the user. A "data submission," for the purpose of this disclosure, is an assemblage of data provided by the user as an input source. In a non-limiting example, data submission may include a user uploading one or more data collections to processor 104. Additionally, or alternatively, user profile 108 may include one or more answers to smart assessment.

With continued reference to FIG. 1, a user profile 108 may include user records. As used in the current disclosure, a "user record" is a document that contains information regarding the user. User records may include user credentials, reports, financial records, medical records, business records, Asset inventory, and government records (i.e. birth certificates, social security cards, and the like). A user record may additionally include an employee record. An employee record may include things like employee evaluations, human resource records, client files, invoices, timecards, driver's license databases, news articles, social media profiles and/or posts, and the like. User records may be identified using a web crawler. User records may include a variety of types of "notes" entered over time by the user, employees of the user, support staff, advisors, and the like. User records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, user profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the user profile 108 and user data. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract user records, inventory records, financial records, human resource records, past user profiles 108, sales records, user notes, and observations, based on criteria such as a time, location, and the like.

With continued reference to FIG. 1, a user may be exposed to a plurality of industrial stimuli 116. As used in the current disclosure, "industrial stimuli" is any interaction that occurs in the course of completing a task or set of tasks. Industrial stimuli 116 may include anything that user encounters during a predetermined time period. This time period may include a workday, work week, during a meeting, networking event, and the like. Example of industrial stimuli 116 may include individual conversation, group conversations, screen time (i.e. cell phone, tablet, computer, etc.), personal cellphone use, phone calls, emails, excessive noise, and the like. Industrial stimuli 116 may include conversations between people. Industrial stimuli 116 may include conversations that are had during lunches, meetings, networking events, professional events, and the like. Industrial stimuli 116 may include personal interactions. As used in the current disclosure, a "personal interaction" is a conversation or exchange between two or more individuals. A personal interaction may take place in a face-to-face setting or through a communication medium such as phone, video call, instant messaging, and the like. Personal interactions can range from casual conversations with friends and family to more formal interactions with colleagues or business associates. In an embodiment, a processor 104 may use a sensor to determine when the user is being exposed to an industrial stimulus 116. In a non-limiting example, a sensor may be used to determine when a user is engaging in a conversation. In another non-limiting example, an eye sensor may be used to determine a user's eye placement. A processor 104 may use any sensor mentioned herein to determine the user's exposure and the duration of that exposure to industrial stimuli 116.

With continued reference to FIG. 1, processor 104 may generate an attention parameter 120 as a function of the industrial data 112 and the industrial stimuli 116. An attention parameter 120 may be used to determine what the user is focusing on. As used in the current disclosure, an "attention parameter" is data regarding physiological data relating to the users attention span while engaged in industrial stimuli 116. An attention parameter 120 may include a measurement of the users physiological reactions to the industrial stimuli 116. An attention parameter 120 may comprise an eye parameters, audio parameter, visual parameter, movements, keystrokes, among other physiological data. As used in the current disclosure, an "audio parameter" is data related to the verbal sound of any conversation a user engages in. As used in the current disclosure, a "visual parameter" is data related to any visuals a user sees during a time period. Audio parameters and visual parameters may be recorded using a sensor or a wearable device. As used in the current disclosure, "physiological data" is any information related to the biological signals generated by a user. As used in the current disclosure, a "biological signal" is an electrical, chemical, or mechanical signal that are produced by living organisms as a result of various physiological processes. Examples of biometric signals may include blood pressure, respiration rate, hormone levels, blood glucose levels, eye movement, and the like. Physiological data may include chemical, biological, physical, and behavioral data relating to a user. Physiological data may include information regarding a user's health including medical history, user diet, exercise, sleep, family medical history, and the like. In other embodiments, physiological data may include information collected from a standard health screening such as X-rays, MRI, blood test, lab tests, examinations, and the like. In some embodiments, physiological data may be extracted from a user using at least one sensor. Physiological data may include information such as perspiration rate, eye tracking, breathing rate, heart rate, user movement (i.e. nervous twitches, leg bounce, fidgeting, etc.), and the like.

With continued reference to FIG. 1, apparatus 100 may use a sensor 124 to detect an attention parameter 120. A sensor 124 may be used to detect physiological data. As used in this disclosure, a "sensor" is a sensor device that produces an electrical output signal for purpose of sensing and monitoring biological events or changes in its environment. In some embodiments, the sensor 124 may include one or more processors that perform one or more processing steps as described in this disclosure. In some cases, the sensor may include, without limitation, a microphone, EMG sensor, ECG sensor, glucometer sensor, pressure sensor, acoustic sensor, image sensor, magnetic field sensor, movement sensor, eye tracker, and the like thereof. In some embodiments, without limitation, the sensor 124 may include a physical sensor, wherein the physical sensor is a device that measures a physical quantity. In some cases, the sensor 124 may convert physical quantity into an output signal which can be read by processor 104. In some cases, a sensor 124 may include, without limitation, a biosensor, electrochemical biosensor, physical biosensor, optical biosensor, wearable biosensor, and the like thereof.

With continued reference to FIG. 1, a processor 104 may a sensor 124 may include a wearable device. As used in the current disclosure, a "wearable device" is a computing device that is designed to be worn on a user's body or clothing. The wearable device may detect an attention parameter 120, user data, or wearable device data. In embodiments, a wearable device may include a smart watch, smart ring, fitness tracking device, smart glasses, and the like. As used in the current disclosure, "wearable device data" is data collected by a wearable device. Wearable device data may include data and associated analysis corresponding to, for instance and without limitation, accelerometer data, pedometer data, gyroscope data, electrocardiogram (ECG) data, electrooculography (EOG) data, bioimpedance data, blood pressure and heart rate monitoring, oxygenation data, biosensors, fitness trackers, force monitors, motion sensors, video and voice capture data, social media platform data, and the like. User profile 108 may be provided by a user or a second individual on behalf of a user, for instance and without limitation a physician, medical professional, nurse, hospice care worker, mental health professional, and the like. User profile 108 may originate from a user questionnaire, graphical user interface (GUI), or any other suitable forum for gathering information regarding user data. Persons skilled in the art, upon review of this disclosure in its entirety, will be aware of the various ways in which user data may be collected and provided to the system described herein.

With continued reference to FIG. 1, a processor 104 may generate an attention parameter 120 using an eye tracking system. In some embodiments, the eye tracking systems may be head-mounted, some may require the head to be stable, and some may function remotely and automatically track the head during motion. In some embodiments, the eye tracking system may include at least an eye sensor. As used in this disclosure, an "eye sensor" is any system or device that is configured or adapted to detect an eye parameter as a function of an eye phenomenon. In some cases, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In some cases, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. Eye sensor may include any sensor described in this disclosure. In some embodiments, at least an eye sensor may include an electromyography sensor. An electromyography sensor may be configured to detect at least an eye parameter as a function of at least an eye phenomenon.

With continued reference to FIG. 1, images of eyes may be captured by a sensor 124 comprising a camera. As used in this disclosure, a "camera" is a device that is configured to sense electromagnetic radiation, such as without limitation visible light, and generate an image representing electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complementary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object (e.g., a user or user's eyes). In some cases, image data may be generated by a camera. "Image data" may be used interchangeably through this disclosure with "image," where the image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

With continued reference to FIG. 1, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video. Persons skilled in the art, upon reviewing the entirety of this disclosure, will be aware of various types of cameras that may be used for the disclosure.

With continued reference to FIG. 1, in some cases, a camera may be used to determine eye patterns (e.g., track eye movements). For instance, camera may capture images and processor (internal or external) to camera may process images to track eye movements. In some embodiments, a video-based eye tracker may use corneal reflection (e.g., first Purkinje image) and a center of pupil as features to track over time. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In some cases, optical methods, particularly those based on video recording, may be used for gaze-tracking and may be non-invasive and inexpensive.

With continued reference to FIG. 1, processor 104 is configured to identify an engagement element 132 as a function of the attention parameter 120. As used in the current disclosure, an "engagement element" is an element of data related to how engaged the user is during a given time period. An engagement element 132 may describe how the user spends his/her time while having one or more tasks to complete. Engagement relates to how focused a user is on a given task. An engaged user may devote a majority of their attention to completing a task. An engagement element 132 may include information regarding how a user spent his/her time, these may be separated by task or time increments. Engagement of the user may refer to the amount of time a user spends on a task and the percentage of that time a user is actively engaged in completing that task. For example, if a user is tasked with completing a report as described by industrial data 112. An engagement element 132 may describe how long it takes a user to draft a report and how that time was spent. This may include a portion of time delegated to research, drafting, revision, and the like.

Still referring to FIG. 1, the engagement element 132 may include data regarding with the differentiation between time on task and unproductive time. Unproductive time may include time when the user is not focusing his/her attention on the task. This may include personal phone use or use of social media sites during the given time period. Unproductive time may additionally include any personal interactions a user engages in that is not related to the task. As used in the current disclosure, "on task" is time that the user is actively engaged in the completing a task. When a user is on task the user the user is directing most of his/her attention to the task. This may include time when a user is actively working on the task. This may include meetings, typing, manual labor, reading, work related conversations, and the like. In a non-limiting example, an attention parameter 120 provides that a user had three personal interactions during the day. Processor 104 may generate an engagement element which identifies two of the personal interactions as on task and third personal interaction as unproductive time.

With continued reference to FIG. 1, an engagement element 120 may include a language parameter. As used in the current disclosure, a "language parameter" is an element of data describing the content of a user's speech. This may include any personal interactions between the user and any third-party, specifically a co-worker. A language parameter may comprise an identification of who the user is talking to along with the subject matter of that conversation. A processor 104 may identify who the user is talking to using a voice parameter. In an embodiment, a processor may use the voice parameter to identify the third party using a voice recognition software. A language parameter may be used to classify the each of the users personal interactions as an on task personal interaction or a non-productive personal interaction. An on-task personal interaction is an interaction that helps the user progress towards a pre-determined goal or progressing the completion of one or more tasks that have been assigned to the user. A non-productive personal interaction is any other interaction that is not progressing the user toward their pre-determined goal. A language parameter may be used to classify all or portions of the personal interaction as on task or unproductive. Automatic speech recognition model may identify words or sets of words to determine the content of the conversation. An automatic speech recognition model may use a sensor to iteratively record a conversation of the user and identify who is speaking and the content of the conversations. In a non-limiting example, an engagement element 132 may include a notation of how the user has spent their time over the course of one work week. The engagement element 132 may describe that the user spent a total of 40 hours at work. Then it may further identify that the user spent 15 hours on nonproductive activities and 25 hours on task. This may further be broken down by task. Processor 104 may be configured to automatically determine when a user's changes from a first task to a second task. Processor 104 may additionally be configured to automatically determine if a user is on task or off task. An engagement element 132 may include a determination if a user is on task or off task. An engagement element 132 may include a determination configured to determine what task a user has done. A temporal parameters may include the total time a user spends at work or working on a task or series of tasks.

Still referring to FIG. 1, in some embodiments, processor 104 may use automatic speech recognition model to determine content of each conversation. As used in the current disclosure, "automatic speech recognition model" is a type of machine learning model that is designed to convert spoken language into text. An automatic speech recognition model may require training (i.e., enrollment). In some cases, training an automatic speech recognition model may require an individual speaker to read text or isolated vocabulary. In some cases, a solicitation video may include an audio component having audible verbal content, the contents of which are known as a priority by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from the audio content, rather than what the speaker is saying. In some cases, processor 104 may first recognize a speaker of verbal audio content and then automatically recognize the speech of the speaker, for example by way speaker-dependent automatic speech recognition model or process. In some embodiments, an automatic speech recognition process can be used to authenticate or verify an identity of a speaker. In some cases, a speaker may or may not include a subject. For example, the subject may speak within the solicitation video, but others may speak as well.

Still referring to FIG. 1, in some embodiments, an automatic speech recognition process may include one or all of the acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right contexts may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum probability estimate of a most likely sequence of hidden states (i.e., Viterbi path) that results in a sequence of observed events. Viterbi algorithms may be employed in the context of Markov information sources and hidden Markov models. A Viterbi algorithm may be used to find the best path, for example using a dynamically created combination hidden Markov model, having both acoustic and language model information, using a statically created combination hidden Markov model (e.g., finite state transducer [FST] approach).

Still referring to FIG. 1, in some embodiments, an automatic speech recognition process may employ dynamic time warping (DTW)-based approaches. Dynamic time warping may include algorithms for measuring the similarity between two sequences, which may vary in time or speed. For instance, similarities in walking patterns would be detected, even if in one video the person was walking slowly and if in another he or she were walking more quickly, or even if there were accelerations and decelerations during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow processor 104 to find an optimal match between two given sequences (e.g., time series) with certain restrictions. That is, in some cases, sequences can be "warped" non-linearly to match each other. In some cases, a DTW-based sequence alignment method may be used in the context of hidden Markov models.

Still referring to FIG. 1, in some embodiments, an automatic speech recognition process may include a neural network. A neural network may include any neural network disclosed herein, for example, those disclosed with reference to FIGS. 2 and 4-5. In some cases, neural networks may be used for automatic speech recognition, including phoneme classification, phoneme classification through multi-objective evolutionary algorithms, isolated word recognition, audiovisual speech recognition, audiovisual speaker recognition, and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, processor 104 may generate the engagement element 132 using an engagement classifier 128. As used in the current disclosure, an "engagement classifier" is a classifier that is configured to generate an engagement element 132. Engagement classifier 128 may be consistent with the classifier described below in FIG. 2. Inputs to the engagement classifier 128 may include user profile 108, industrial data 112, industrial stimuli 116, attention parameter 120, and the like. Outputs to the engagement classifier 128 may include an engagement element 132 tailored to the attention parameter 120. In an embodiment, an engagement classifier 128 may classify a plurality of attention parameters 120 correlated into two or more categories. Those categories may include on task and unproductive time. Engagement training data is a plurality of data entries containing a plurality of inputs that are correlated to a plurality of outputs for training a processor by a machine-learning process. In an embodiment, engagement training data may comprise a plurality of attention parameters 120 correlated to examples of engagement elements 128. Engagement training data may be received from database 300. Engagement training data may contain information regarding user profile 108, industrial data 112, industrial stimuli 116, attention parameter 120, an example of an engagement element 132, and the like. Classifier may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a classifier, such as engagement classifier 128, may be implemented as a fuzzy inferencing system. As used in the current disclosure, a "fuzzy inference" is a method that interprets the values in the input vector (i.e., attention parameters 120 and examples of engagement elements 132) and, based on a set of rules, assigns values to the output vector. A set of fuzzy rules may include a collection of linguistic variables that describe how the system should make a decision regarding classifying an input or controlling an output. An example of linguistic variables may include variables that represent one or more engagement elements 132. Examples of linguistic variables may include terms such as "Highly Engaged," "Moderately Engaged," and "Slightly Engaged," and "Not Engaged." Attention parameters 120 and examples of engagement elements 132 may each individually represent a fuzzy set. The engagement elements 132 may be determined by a comparison of the degree of match between a first fuzzy set and a second fuzzy set, and/or single values therein with each other or with either set, which is sufficient for purposes of the matching process.

Still referring to FIG. 1, the engagement element 132 may be determined as a function of the intersection between two fuzzy sets. Ranking the engagement element 132 may include utilizing a fuzzy set inference system as described herein below, or any scoring methods as described throughout this disclosure. For example, without limitation processor 104 may use a fuzzy logic model to determine engagement element 132 as a function of fuzzy set comparison techniques as described in this disclosure. In some embodiments, each piece of information associated with a plurality of attention parameters 120 may be compared to one or more examples of engagement element 132, wherein engagement element 132 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare attention parameters 120 and examples of engagement elements 132 with a goal of generating an engagement element 132 specific to the user profile 108. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

With continued reference to FIG. 1, engagement classifier 128 may greatly enhance the functionality of software for generating and improving an engagement element 132 related to a user. By leveraging large datasets and advanced algorithms, engagement classifier 128 can analyze patterns, extract insights, and make accurate predictions based on user behavior and preferences. This may enable apparatus 100 to generate an engagement element 132 that reflects the likelihood or reliability of specific outcomes or recommendations for the user. Through continuous learning and adaptation, engagement classifier 128 may dynamically update the engagement element 132 based on real-time data. This enables software to provide personalized and contextually relevant results, improving user satisfaction and engagement. Machine learning also enables software to identify and analyze complex relationships and dependencies that may be difficult for traditional rule-based systems to capture. As a result, the generated engagement element 132 becomes more accurate and reliable, empowering users to make informed decisions based on trustworthy insights and predictions.

With continued reference to FIG. 1, processor 104 may be configured to update the training data of the engagement classifier 128 using user inputs. An engagement classifier 128 may use user input to update its training data, thereby improving its performance and accuracy. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model or classifier. For example, the accuracy of a plurality of engagement elements 132 may be averaged to determine an accuracy score. In some embodiments, an accuracy score may be determined for a particular user or a set users. Accuracy score or another score as described above may indicate a degree of retraining needed for a machine-learning model. Processor 104 may perform a larger number of retraining cycles for a higher number (or lower number, depending on a numerical interpretation used), and/or may collect more training data for such retraining.

Still referring to FIG. 1, the processor may be configured to generate a machine-learning model, such as engagement classifier 128, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as engagement classifier 128, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 is configured to determine productivity data 136 as a function of the engagement element 132. As used in the current disclosure, "productivity data" is an element of data that is associated with the productivity of the user. The productivity of the user may be described by in terms of how a user spends their time. A productive user may spend most of their time on task, whereas an unproductive user may spend a significant amount of time on unproductive tasks. Productivity data 136 may additionally refer to information that is collected and analyzed to evaluate the efficiency and output of a user. A processor 104 may generate productivity data 136 by comparing engagement element 132 to industrial data 112. The industrial data 112 may describe the tasks that were assigned to the user and the estimated completion time will describe how long each task should take. This may be compared to how much time it took the user to complete the task, including how much time the user spent on task versus unproductive time. Excessive unproductive time may negatively affect the productivity data 136. Productivity data 136 may be reflected by the number of on task personal interactions a user has as compared to nonproductive personal interactions, wherein the industrial data 112 may be used to determine what is considered on task and what is considered unproductive time. Productivity data 136 may be expressed as a numerical score or a linguistic value. Productivity data 136 may be represented as a score used to reflect the current productivity of the user. A non-limiting example, of a numerical scale, may include a scale from 1-10, 1-100, 1-1000, and the like, wherein a rating of 1 may represent a user who is unproductive, whereas a rating of 10 may represent a user who is highly productive. Examples of linguistic values may include, "Unproductive," "Below Average Productivity," "Average Productivity," "Good Productivity," "Excellent Productivity," and the like. In some embodiments, a numerical score range may be represented by a linguistic value. As used in the current disclosure, a "numerical score range" is a range of scores that are associated with a linguistic value. For example, this may include a score of 0-2 representing "Unproductive" or a score of 8-10 representing "Excellent Productivity." A user's productivity may be scored by classifying the current engagement element 132 to examples of productivity data 136 from third parties who are similarly situated by experience, job title, task, and overall productivity. In an embodiment, the productivity data 136 may be displayed in a graphical manner. This may include displaying the productivity data 136 displaying it as a line graph, bar graph, pie chart, scatter plot, histogram, box and whisker plot, heat map, network graph, and the like.

With continued reference to FIG. 1, processor 104 may generate the productivity data 136 using a productivity machine-learning model. As used in the current disclosure, a "productivity machine-learning model" is a machine-learning model that is configured to generate productivity data 136. Productivity machine-learning model may be consistent with the machine-learning model described below in FIG. 2. Inputs to the productivity machine-learning model may include user profile 108, industrial data 112, industrial stimuli 116, attention parameter 120, engagement element 132, and the like. Outputs to the productivity machine-learning model may include a productivity data 136 tailored to the engagement element 132. Productivity training data is a plurality of data entries containing a plurality of inputs that are correlated to a plurality of outputs for training a processor by a machine-learning process. In an embodiment, productivity training data may comprise a plurality of attention parameters 120 correlated to examples of engagement elements 132. Productivity training data may be received from database 300. Productivity training data may contain information regarding user profile 108, industrial data 112, industrial stimuli 116, attention parameter 120, engagement element 132, examples of productivity data 136, and the like. Machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning models, learning vector quantization, and/or neural network-based machine-learning models.

With continued reference to FIG. 1, a numerical score range representing productivity data 136 may be adjusted using linguistic values. Processor 104 may adjust the numerical score range according to the desired level of production from the user. Alternatively, processor 104 may adjust the numerical score range to indicate the impact the disease or condition will have on the user's lifespan. A numerical score range may be determined by comparing the desired level of production from the user to previous iterations of the numerical score ranges. Previous iterations' numerical score ranges may be taken from users who are similarly situated to the current user by experience, job title, task, and overall productivity, and the like. Previous iterations of a numerical score range may be received from database 300. A numerical score range may be generated using a range machine learning model. As used in the current disclosure, a "range machine-learning model" is a machine-learning model that is configured to identify a numerical score range. The range machine-learning model may be consistent with the machine-learning model described below in FIG. 2. Inputs to the range machine-learning model may include a user profile 108, industrial data 112, Industrial stimuli 116, attention parameter 120, engagement element 132, productivity data 136, and the like. Outputs to the range machine-learning model may include a numerical score range. Range training data is a plurality of data entries containing a plurality of inputs that are correlated to a plurality of outputs for training a processor by a machine-learning process to correlate productivity data 136 to examples of numerical score ranges. Range training data may be received from database 300. Range training data may contain information about user profile 108, industrial data 112, Industrial stimuli 116, attention parameter 120, engagement element 132, productivity data 136, examples of numerical score ranges, and the like. Range training data may comprise correlations between productivity data 136 to examples of numerical score ranges. Machine learning model may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to generate a notification 140 as a function of productivity data 136. As used in the current disclosure, a "notification" is a message or alert that informs the users about a particular event or update. Notifications 140 can take various forms, such as a pop-up window, sound, vibration, or banner displayed on a device's lock screen or notification center. A notification 140 may include an audio notification, visual notification, haptic notification, textual notification, or any combination thereof. A notification 140 may indicate to a user that they are being unproductive, or they have fallen below a productivity threshold. A notification may additionally indicate to a user the nature of their conversation is nonproduction or on task. Notifications 140 may take the form of a push notification on a user device, such as a smart phone, laptop, computer, or tablet. A notification 140 may be generated if a user productivity data 136 falls below a productivity threshold. As used in the current disclosure, a "productivity threshold" is the level of productivity required for a person to be considered effective or efficient in their job or task. This threshold may be determined by the specific expectations and goals set by an employer or individual. In a non-limiting example, if an employer expects their employees to complete a certain amount of work within a given timeframe, then the productivity threshold would be the minimum level of work output required to meet those expectations. Similarly, in a personal project, a productivity threshold may be the amount of work or progress that needs to be made in order to achieve a specific goal or deadline. The productivity threshold may vary depending on the context and the individual's abilities, skills, and experience. It can also change over time as expectations and goals evolve. Generally, the goal of a productivity threshold is to ensure that individuals are working at a level that meets the demands of their job or task and contributes to their overall success. In another embodiment, notification 140 may be generated if the users spend an extended time in an unproductive manner. In a non-limiting example, if a user is engaged in an unproductive personal interaction for 45 consecutive minutes a user may receive a notification 140.

Still referring to FIG. 1, processor 104 may be configured to display the notification 140 using a display device 144. As used in the current disclosure, a "display device" is a device that is used to display content. A display device 144 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
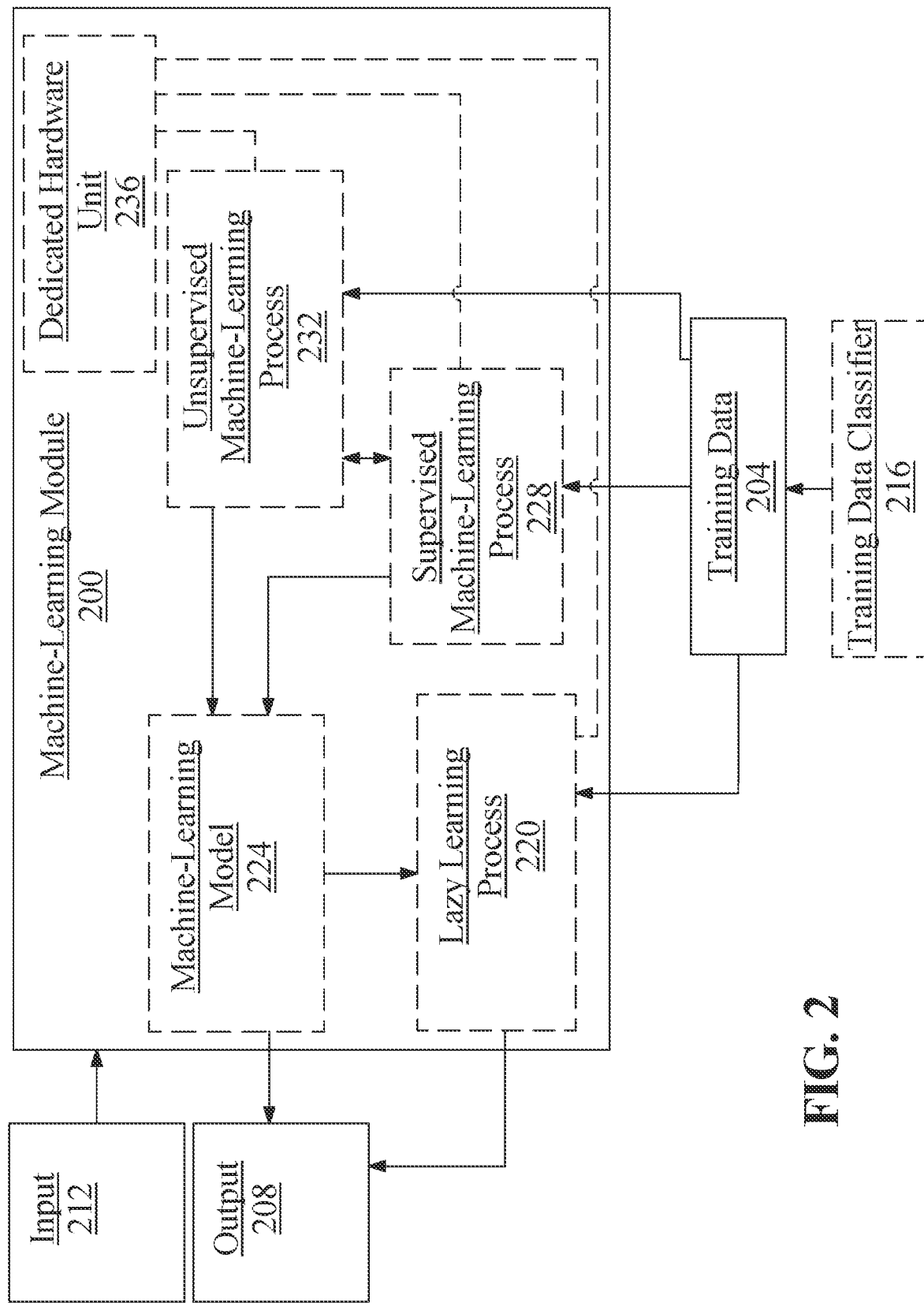
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a plurality of attention parameters 120 may be used as inputs whereas a plurality of engagement elements 128 may include an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to according to user traits or demographics such as job title, length of employment, job experience, age, gender, and the like. Training data classifier 216 may also classify elements of training data according to the types of tasks the user is engaged in.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include [user profile 108, industrial data 112, industrial stimuli 116, attention parameter 120, and the like as described above as inputs, engagement element 132 tailored to the attention parameter 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
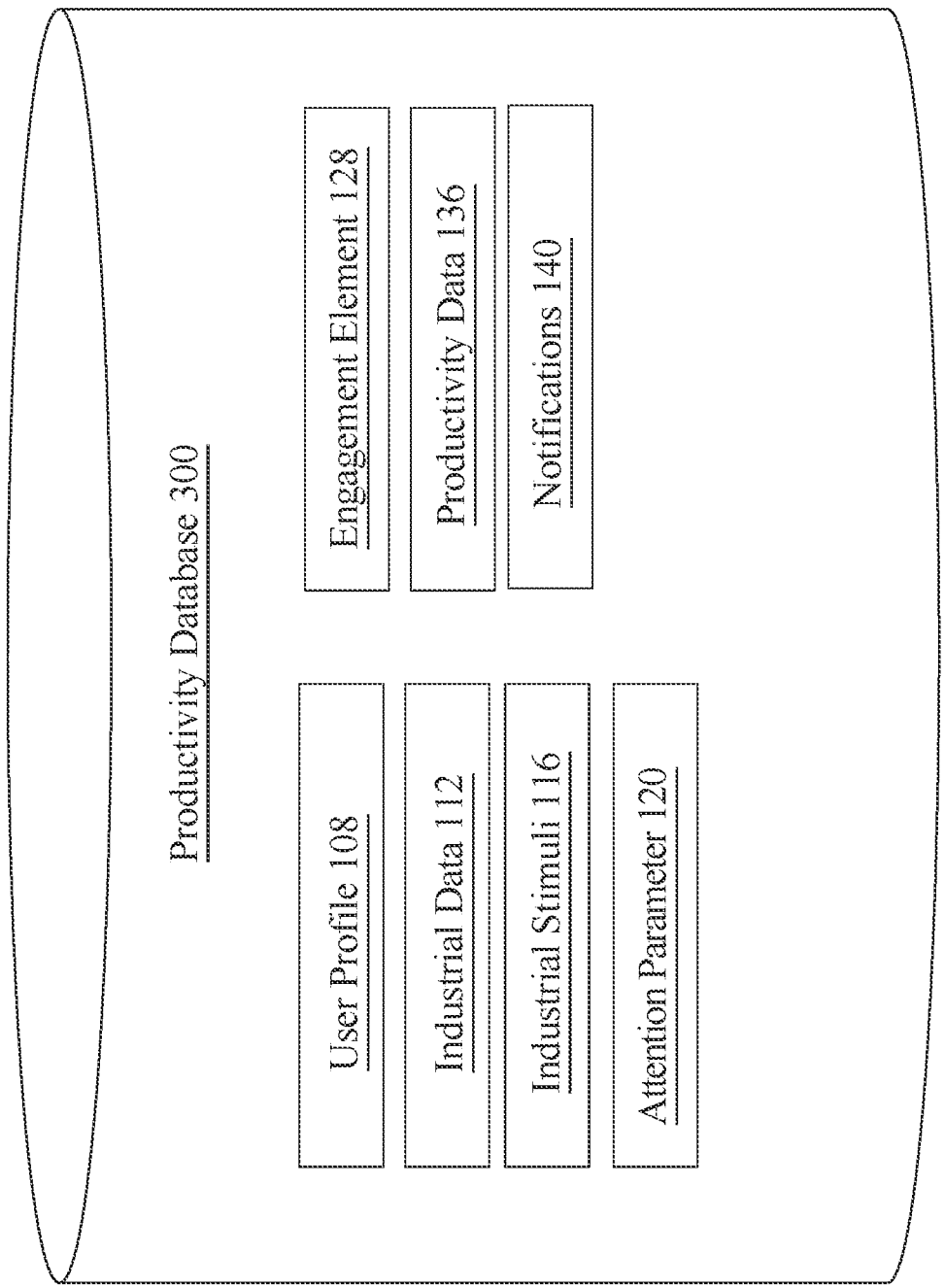
FIG. 3 is a block diagram of an exemplary embodiment of a productivity database.

Now referring to FIG. 3, an exemplary productivity database 300 is illustrated by way of block diagram. In an embodiment, any past or present versions of data disclosed herein may be stored within user profile 108, industrial data 112, industrial stimuli 116, attention parameter 120, engagement element 132, productivity data 136, notifications 140, and the like. Processor 104 may be communicatively connected with productivity database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local servers or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Productivity database 300 may be implemented, without limitation, as a relational database, a key-value retrieval database such as a NOSQL database, or any other format or structure for use as a database that a person skilled in the art would recognize as suitable upon review of the entirety of this disclosure. Productivity database 300 may alternatively or additionally be implemented using a distributed data storage protocol and/or data structure, such as a distributed hash table or the like. Productivity database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
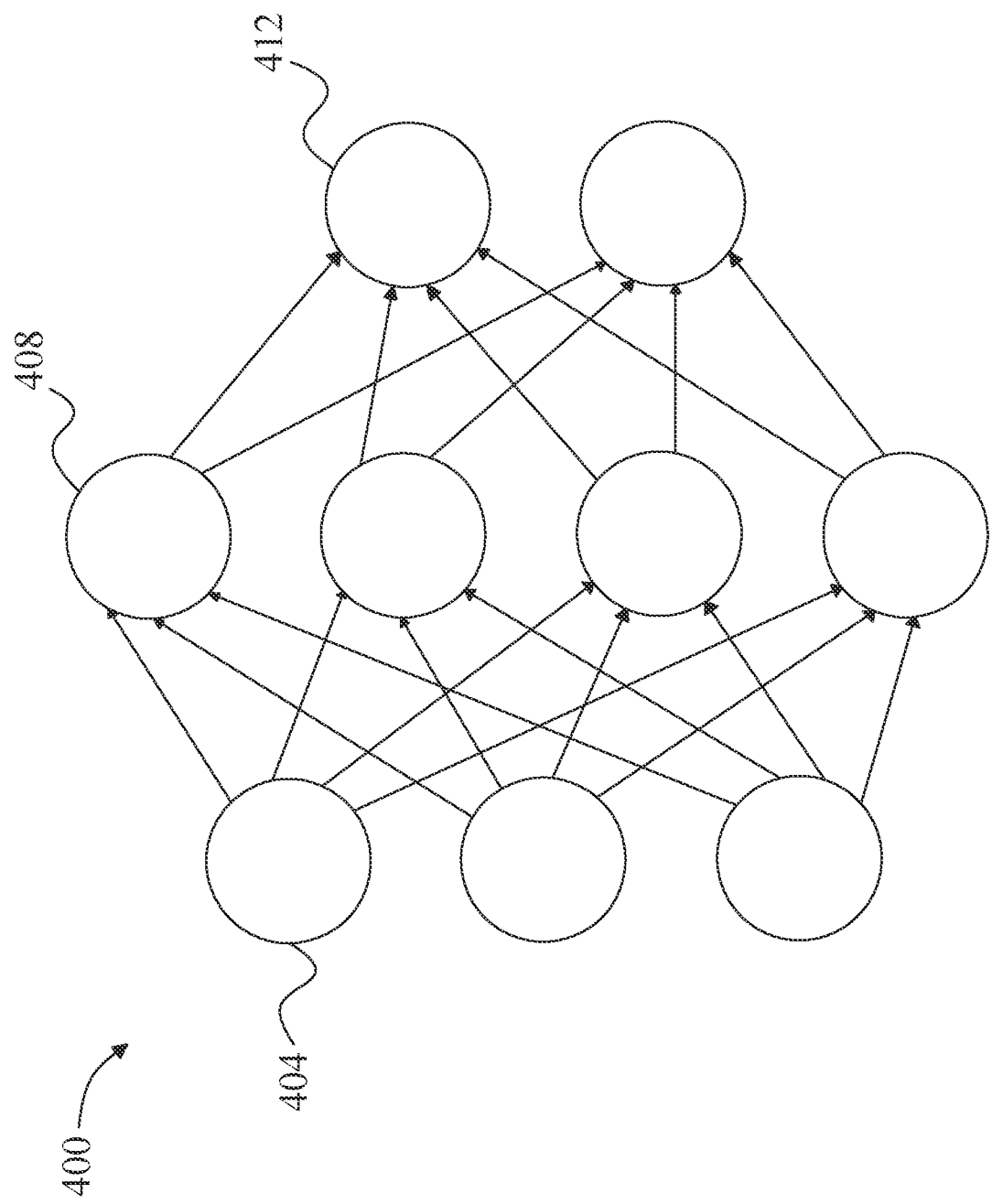
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
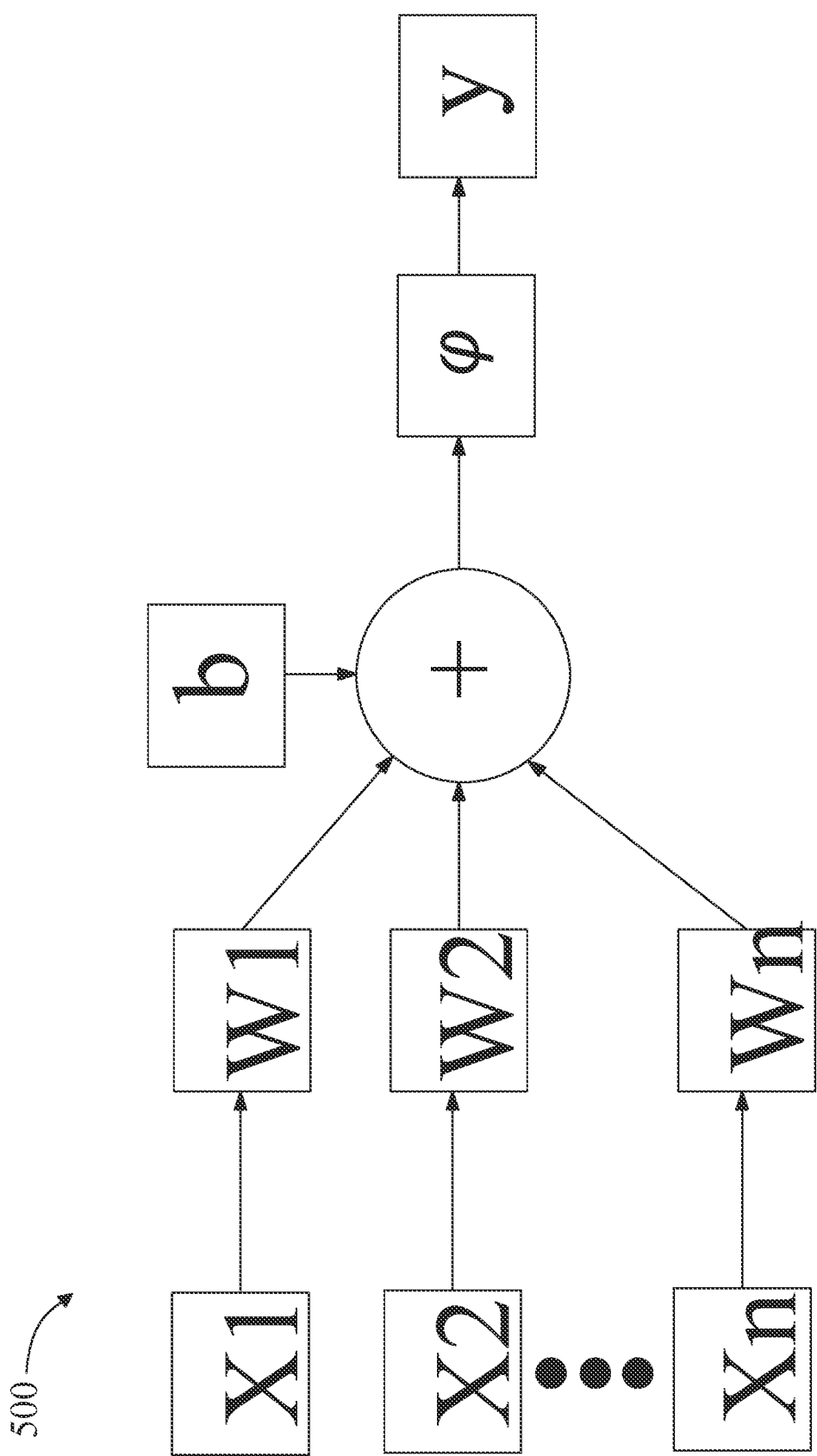
FIG. 5 is a diagram of an exemplary embodiment of a node of a neural network.

Referring now to FIG. 5, an exemplary embodiment of a node of a neural network is illustrated. A node may include, without limitation, a plurality of inputs x, that may receive numerical values from inputs to a neural network containing the node and/or from other nodes. Node may perform a weighted sum of inputs using weights w', that are multiplied by respective inputs x1. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight w' applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 6:
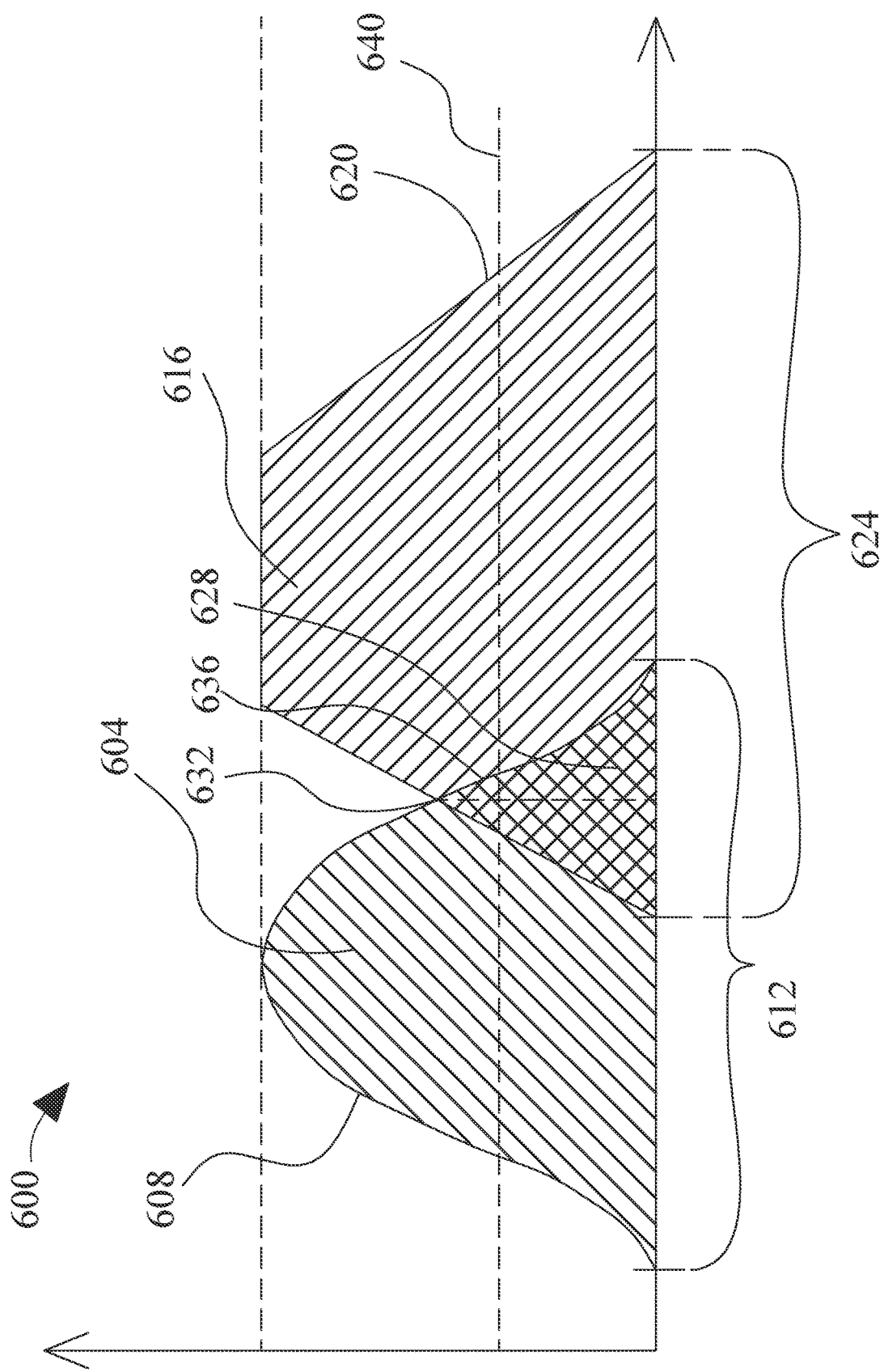
FIG. 6 is an illustration exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a plurality of attention parameters 120 and an example of an engagement element 132 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic.

model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a plurality of attention parameters 120 and an example of engagement element 132. For instance, an acceptance variable may represent a first measurable value pertaining to the classification of a plurality of attention parameters 120 to an example of engagement element 132. Continuing the example, an output variable may represent an engagement element 132 tailored to the user profile 108. In an embodiment, a plurality of attention parameters 120 and/or an example of engagement element 132 may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤ T(c, d) if a≤ c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤ c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of attention parameters 120 and an example of engagement element 132. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, an engagement element 132 may indicate a sufficient degree of overlap with fuzzy set representing a plurality of attention parameters 120 and an example of engagement element 132 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a plurality of attention parameters 120 and an example of an engagement element 132 have fuzzy sets, an engagement element 132 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
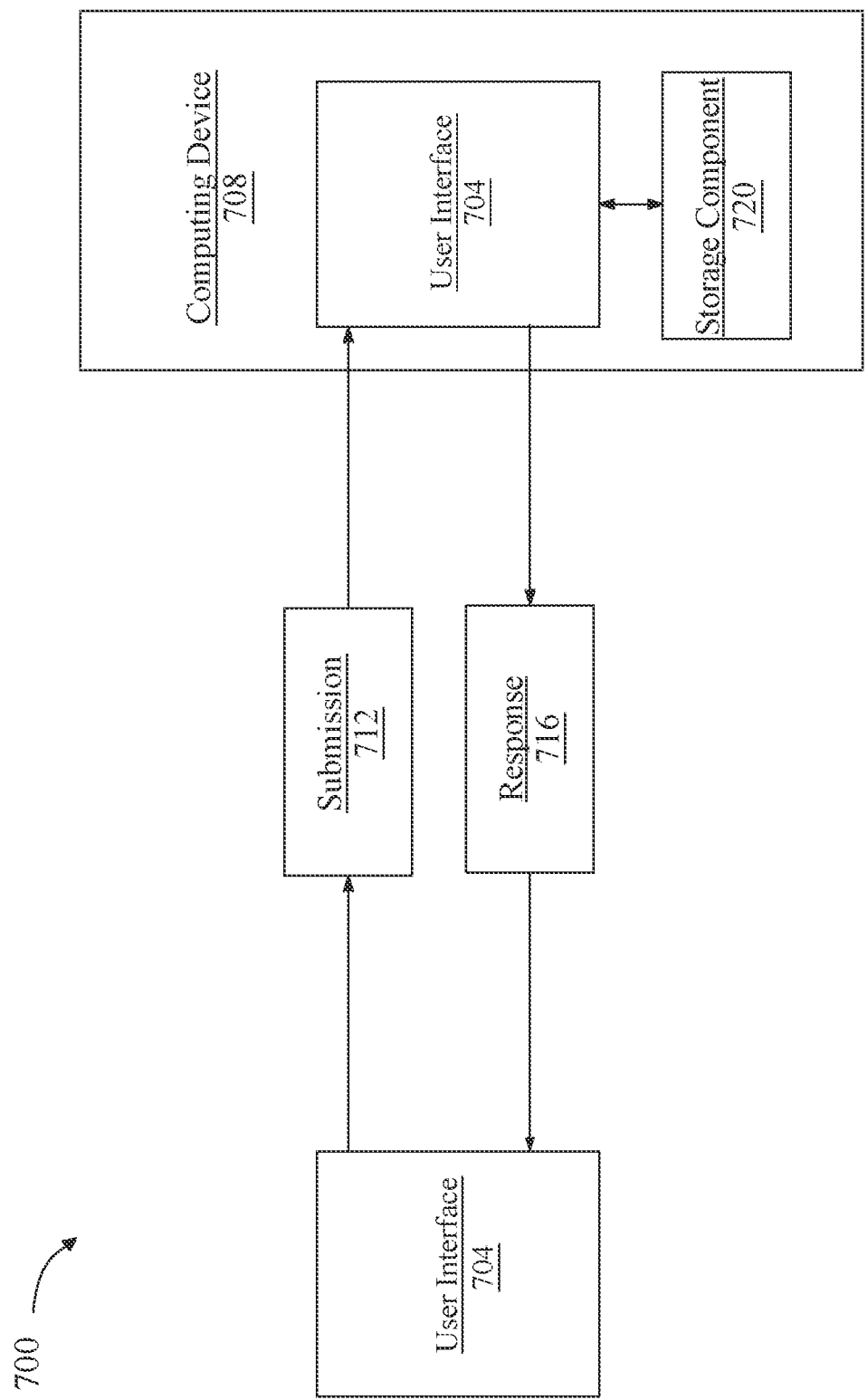
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 7112 using one or more of keyword recognition, pattern matching, and natural language processing. In some embodiments, processor employs real-time learning with evolutionary algorithms. In some cases, processor may retrieve a pre-prepared response from at least a storage component 720, based upon submission

712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, database, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
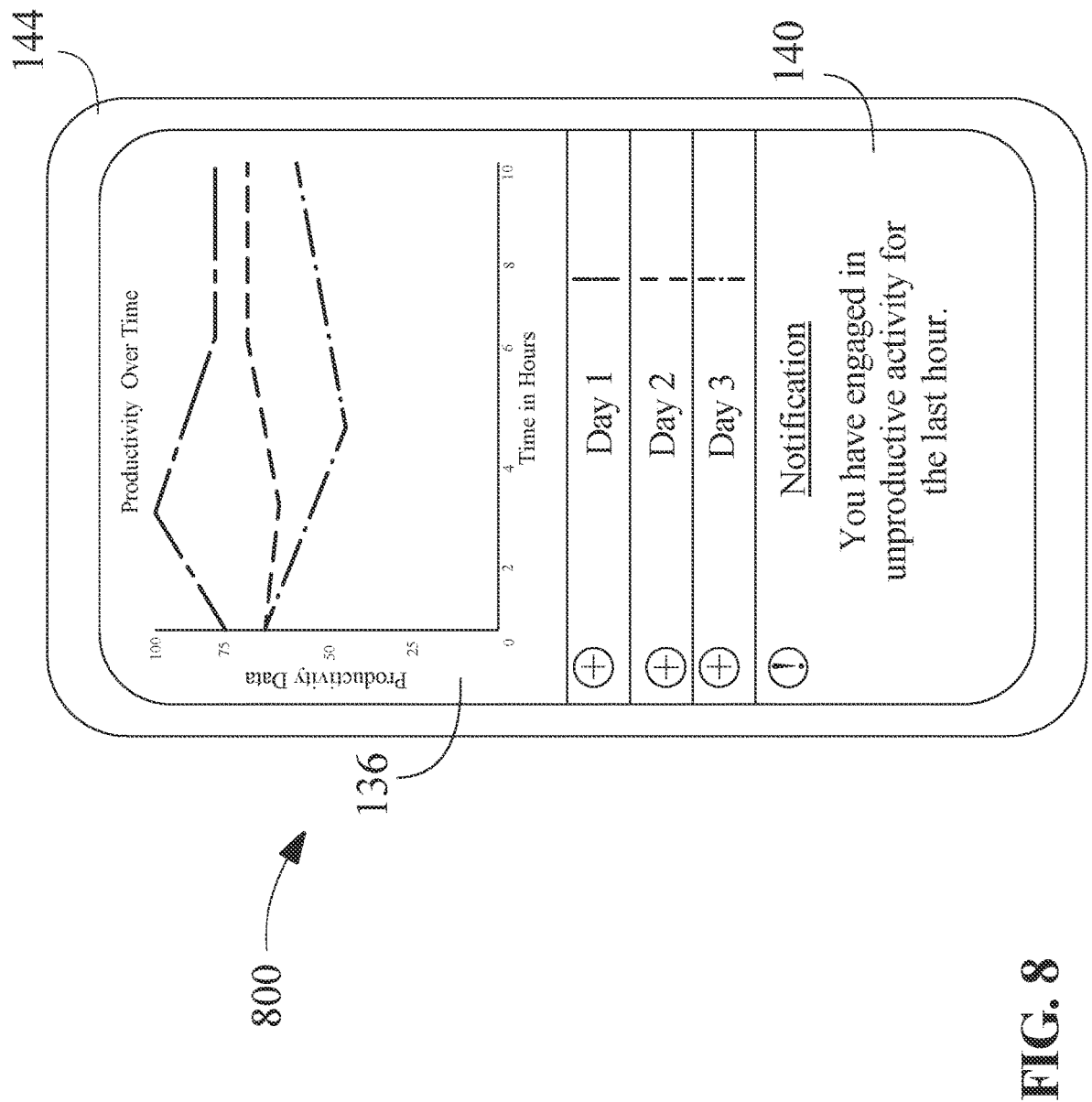
FIG. 8 is an exemplary embodiment of a user interface.

Now referring to FIG. 8, an exemplary representation of a user interface component is presented. User interface 800 may include a display device such as display device 144. In an embodiment, user interface 800 may display the notification 140 and productivity data 136. In an embodiment, user interface 800 may display a detailed account of how the productivity data 136 is generated as a function of the engagement element 132. In an example, without limitations, user interface 800 may display a graphical representation the productivity data 136. This may include trendlines depicting how the users biometric signals are improving and the rate at which they are improving. In some embodiments, a user interface 800 may be configured to display the notification 140. In some embodiments, user interface 800 may display a plurality of questions which require the user to enter information regarding the user profile 108 and industrial data 116. User interface 800 may present a user questions to generate the user profile 108.

Figure 9:
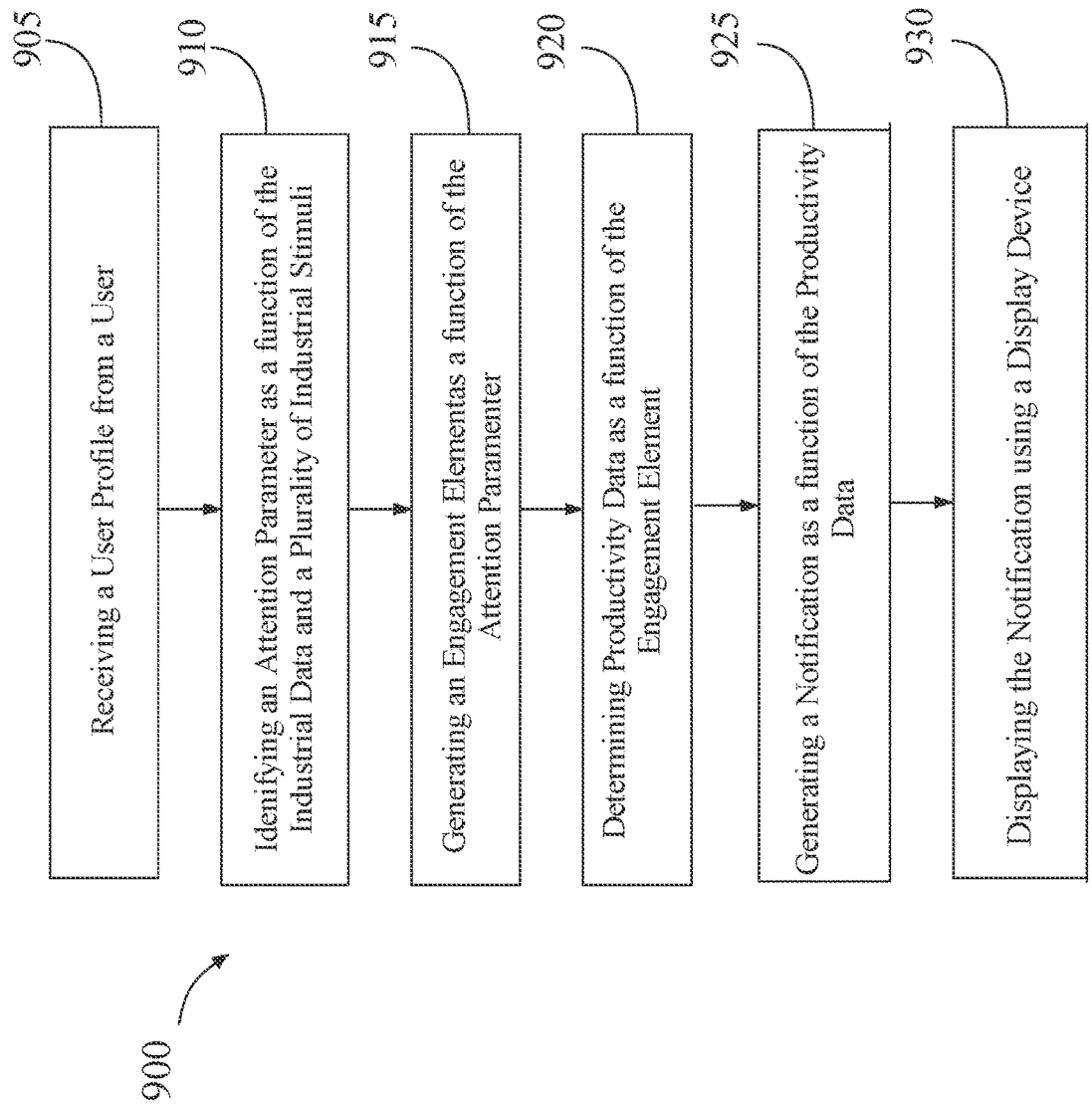
FIG. 9 is a flow diagram of an exemplary method for the generation of productivity data.

Referring now to FIG. 9, a flow diagram of an exemplary method 900 for the generation of productivity data is illustrated. At step 905, method 900 includes receiving a user profile from a user, wherein the user profile comprises industrial data. This may be implemented as described and with reference to FIGS. 1-9. In some embodiments, extracting the user profile may comprise extracting the user profile using a web crawler or a chatbot. In another embodiment, extracting the user profile may comprise extracting the user profile using at least a sensor, wherein the at least a sensor comprises a wearable device or a camera.

Still referring to FIG. 9, at step 910, method 900 includes identifying an attention parameter as a function of the industrial data and a plurality of industrial stimuli, wherein identifying the attention parameter comprises receiving physiological data from a plurality of sensors. This may be implemented as described and with reference to FIGS. 1-9. In an embodiment, the method may include identifying, using the at least a processor, the attention parameter using an automatic speech recognition model. In another embodiment, the attention parameter may comprise an eye parameter. In some cases, the plurality of industrial stimuli comprises a personal interaction.

Still referring to FIG. 9, at step 915, method 900 includes generating an engagement element as a function of the attention parameter. This may be implemented as described and with reference to FIGS. 1-9. In an embodiment, the engagement element may comprise a language parameter. In another embodiment, the method may further comprise generating, using the at least a processor, the engagement element using an engagement classifier. Generating the engagement element using the engagement classifier may comprise training the engagement classifier using confidence training data, wherein the engagement training data contains a plurality of data entries containing the attention parameter as inputs correlated to the engagement element as outputs and generating the engagement element as a function of the attention parameter using the engagement classifier.

Still referring to FIG. 9, at step 920, method 900 includes determining, using the at least a processor, productivity data as a function of the engagement element. This may be implemented as described and with reference to FIGS. 1-9. In an embodiment, the productivity data may be reflected as a numerical score.

Still referring to FIG. 9, at step 925, method 900 includes generating, using the at least a processor, a notification as a function of the productivity data. This may be implemented as described and with reference to FIGS. 1-9.

Still referring to FIG. 9, at step 930, method 900 includes displaying, using the at least a processor, the notification using a display device. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
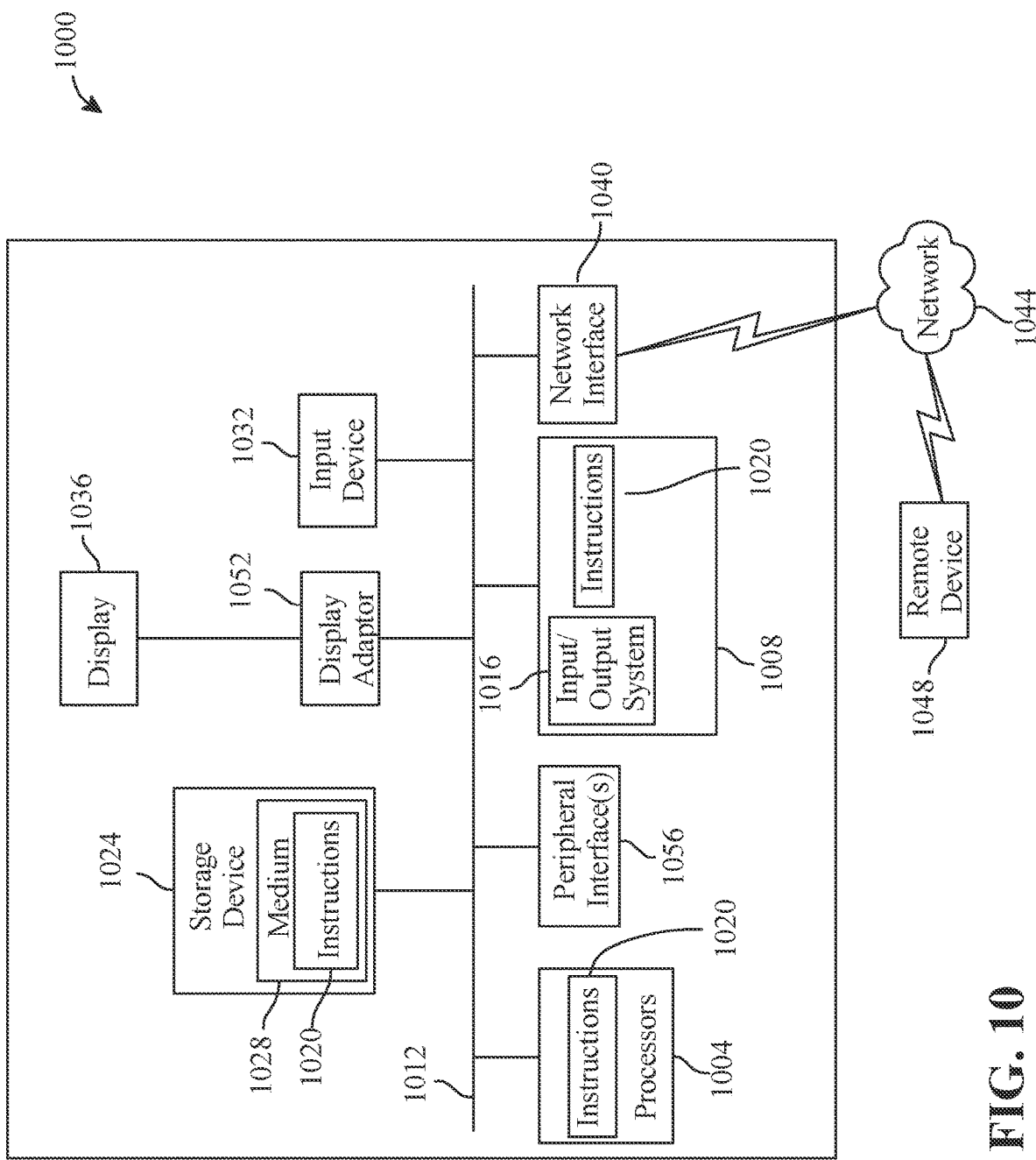
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for the generation of productivity data, wherein the apparatus comprises:
   at least a processor; and
   a memory communicatively connected to the at least a processor, wherein the memory containing instructions configuring the at least a processor to:
   receive a user profile from a user, wherein the user profile comprises industrial data associated with the occupation of the user;
   identify an attention parameter as a function of the industrial data and a plurality of industrial stimuli, wherein identifying the attention parameter comprises receiving physiological data from a device containing a plurality of sensors used to determine the user's exposure and the duration of that exposure to industrial stimuli, wherein identifying a plurality of industrial stimuli comprises a personal interaction;

generate an engagement element as a function of the attention parameter, wherein the engagement element is further generated using an engagement classifier trained using engagement training data, wherein training the engagement classifier further comprises:

using the engagement training data applied to an input layer of nodes comprising at least a plurality of attention parameter inputs, one or more intermediate layers of nodes, and an output layer of nodes comprising at least an example of engagement element outputs;

adjusting one or more connections and one or more weights between nodes in adjacent layers of the engagement classifier;

detecting additional correlations between the output layer of nodes and the input layer of nodes; and retraining the engagement classifier as a function of the additional correlations;

determine productivity data as a function of the engagement element;

generate a notification as a function of the productivity data; and display the notification using a display device.

2. The apparatus of claim 1, wherein the plurality of sensors comprises a wearable device.

3. The apparatus of claim 1, wherein the plurality of sensors comprises a camera.

4. The apparatus of claim 1, wherein identifying the attention parameter comprises identifying the attention parameter using an automatic speech recognition model.

5. The apparatus of claim 1, wherein the attention parameter comprises an eye parameter.

6. The apparatus of claim 1, wherein the engagement element comprises a language parameter.

7. The apparatus of claim 1, wherein generating the engagement element comprises generating the engagement element using an engagement classifier.

8. The apparatus of claim 1, wherein the plurality of industrial stimuli comprises a personal interaction.

9. The apparatus of claim 1, wherein the productivity data is reflected as a numerical score.

10. A method for the generation of productivity data, wherein the method comprises:

receiving, using at least a processor, a user profile from a user, wherein the user profile comprises industrial data associated with the occupation of the user;

identifying, using the at least a processor, an attention parameter as a function of the industrial data and a plurality of industrial stimuli, wherein identifying the attention parameter comprises receiving physiological data from a device containing a plurality of sensors used to determine the user's exposure and the duration of that exposure to industrial stimuli, wherein identifying a plurality of industrial stimuli comprises a personal interaction;

generating, using the at least a processor, an engagement element as a function of the attention parameter, wherein the engagement element is further generated using an engagement classifier trained using engagement training data, wherein training the engagement classifier further comprises:

using the engagement training data applied to an input layer of nodes comprising at least a plurality of attention parameter inputs, one or more intermediate layers of nodes, and an output layer of nodes comprising at least an example of engagement element outputs;

adjusting one or more connections and one or more weights between nodes in adjacent layers of the engagement classifier;

detecting additional correlations between the output layer of nodes and the input layer of nodes; and retraining the engagement classifier as a function of the additional correlations;

determining, using the at least a processor, productivity data as a function of the engagement element;

generating, using the at least a processor, a notification as a function of the productivity data; and displaying the notification using a display device.

11. The method of claim 10, wherein the plurality of sensors comprises a wearable device.

12. The method of claim 10, wherein the plurality of sensors comprises a camera.

13. The method of claim 10, wherein the method further comprises identifying, using the at least a processor, the attention parameter using an automatic speech recognition model.

14. The method of claim 10, wherein the attention parameter comprises an eye parameter.

15. The method of claim 10, wherein the engagement element comprises a language parameter.

16. The method of claim 10, wherein the method further comprises generating, using the at least a processor, the engagement element using an engagement classifier.

17. The method of claim 10, wherein the plurality of industrial stimuli comprises a personal interaction.

18. The method of claim 10, wherein the productivity data is reflected as a numerical score.

* * * * *